United States Patent
Chen et al.

(10) Patent No.: US 10,301,204 B2
(45) Date of Patent: May 28, 2019

(54) INTERNAL SULFUR CYCLING SANI (ISC-SANI) PROCESS FOR BIOLOGICAL WASTEWATER TREATMENT

(71) Applicant: THE HONG KONG UNIVERSITY OF SCIENCE AND TECHNOLOGY, Hong Kong (CN)

(72) Inventors: Guanghao Chen, Hong Kong (CN); Feng Jiang, Guangdong (CN); Ho Kwong Chui, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 0 days.

(21) Appl. No.: 15/543,107

(22) PCT Filed: Jan. 12, 2016

(86) PCT No.: PCT/CN2016/070630
§ 371 (c)(1),
(2) Date: Jul. 12, 2017

(87) PCT Pub. No.: WO2016/112835
PCT Pub. Date: Jul. 21, 2016

(65) Prior Publication Data
US 2017/0369350 A1    Dec. 28, 2017

Related U.S. Application Data (60) Provisional application No. 62/125,128, filed on Jan. 14, 2015.

(51) Int. Cl.
*C02F 3/34*       (2006.01)
*C02F 3/00*       (2006.01)
(Continued)

(52) U.S. Cl.
CPC .............. *C02F 3/345* (2013.01); *C02F 3/006* (2013.01); *C02F 3/1263* (2013.01); *C02F 3/282* (2013.01);
(Continued)

(58) Field of Classification Search
CPC .......... C02F 3/345; C02F 3/302; C02F 3/282; C02F 3/1263; C02F 3/301; C02F 3/006;
(Continued)

(56) References Cited

U.S. PATENT DOCUMENTS

| | | | |
|---|---|---|---|
| 2003/0201225 A1* | 10/2003 | Josse | C02F 1/56 210/605 |
| 2013/0256223 A1* | 10/2013 | Chen | C02F 3/2846 210/620 |

FOREIGN PATENT DOCUMENTS

| | | |
|---|---|---|
| CN | 101302069 A | 11/2008 |
| CN | 101585651 A | 11/2009 |

(Continued)

OTHER PUBLICATIONS

International Search Report dated Apr. 18, 2016 issued in corresponding International Application No. PCT/CN2016/070630.
(Continued)

*Primary Examiner* — Fred Prince
(74) *Attorney, Agent, or Firm* — Nath, Goldberg & Meyer; Jerald L. Meyer; Stanley N. Protigal (57) ABSTRACT

A method of removing organic carbon in biological wastewater treatment includes the steps of:
(a) oxidizing organic carbon to carbon dioxide with elemental sulfur as an electron carrier, and reducing the elemental sulfur to sulfide;
(b) oxidizing the sulfide to elemental sulfur by recycled nitrate through controlling one or more of a recycling ratio to maintain an oxidation reduction potential
(Continued)

(ORP) within the range of −360 mv to −420 mv, using an auto ORP controller; (c) recycling the elemental sulfur formed during oxidation of the sulfide back to the oxidation of the organic carbon; and (d) oxidizing ammonium to nitrate then partially recycled back for sulfide oxidation.

5 Claims, 8 Drawing Sheets (51) Int. Cl.
  *C02F 3/12* (2006.01)
  *C02F 3/30* (2006.01)
  *C02F 3/28* (2006.01)
  *C02F 3/06* (2006.01)
  *C02F 101/10* (2006.01)

(52) U.S. Cl.
  CPC .............. *C02F 3/301* (2013.01); *C02F 3/302* (2013.01); *C02F 3/06* (2013.01); *C02F 3/1268* (2013.01); *C02F 3/2846* (2013.01); *C02F 2101/101* (2013.01); *C02F 2209/001* (2013.01); *C02F 2209/04* (2013.01); *Y02W 10/15* (2015.05)

(58) Field of Classification Search
  CPC ............ C02F 2209/001; C02F 2209/04; C02F 3/2846; C02F 3/1268; C02F 3/06; C02F 2101/101; Y02W 10/15
  USPC ....... 210/603, 605, 614, 621, 622, 623, 630, 210/903, 908, 916
  See application file for complete search history.

(56) References Cited

FOREIGN PATENT DOCUMENTS

| | | |
|---|---|---|
| CN | 101693574 A | 4/2010 |
| CN | 101734792 A | 6/2010 |
| CN | 101774692 A | 7/2010 |
| CN | 103183452 A | 7/2013 |
| CN | 103415475 A | 11/2013 |
| CN | 104098177 A | 10/2014 |
| EP | 0 255 745 A1 | 2/1988 |
| KR | 10-1184168 B1 | 9/2012 |

OTHER PUBLICATIONS

Chen, et al., "Optimal process pattern for simultaneous sulfur, nitrogen and carbon removal", Water Science and Technology—WST, 59.4, pp. 833-837, 2009.

Liu, et al., "Innovative Integrated Reactor System for Carbon, Sulfur and Nitrogen Removal Based on Biological Phase-separation", Advanced Materials Research, vols. 518-523, pp. 2547-2552, 2012.

Rao, et al., "Microbial conversion of sulfur dioxide in flue gas to sulfide using bulk drug industry wastewater as an organic by source mixed cultures of sulfate reducing bacteria", Journal of Hazardous Materials, vol. 147, pp. 718-725, 2007.

Reyes-Avila, et al., "Simultaneous biological removal of nitrogen, carbon and sulfur by denitrification", Water Research, vol. 38, pp. 3313-3321, 2004.

Selvaraj, et al., "Microbial Reduction of Sulfur Dioxide with Anaerobically Digested Municipal Sewage Biosolids as Electron Donors", Biotechnol. Prog., vol. 11, pp. 153-158.

Wang, et al., "A novel sulfate reduction, autotrophic denitrification, nitrification integrated (SANI) process for saline wastewater treatment", Water Research, vol. 43, pp. 2363-2372, 2009.

* cited by examiner

INTERNAL SULFUR CYCLING SANI (ISC-SANI) PROCESS FOR BIOLOGICAL WASTEWATER TREATMENT

TECHNICAL FIELD

The present disclosure relates to an internal sulfur cycling sulfate reduction autotrophic denitrification and nitrification integrated (ISC-SANI) process and a method of treating biological wastewater using the same.

BACKGROUND

Providing high volume sewage treatment, as well as treatment of the sludge produced, is a challenge in many countries. Sludge disposal amounts up to 50% of sewage treatment cost, requires energy consumption and produces greenhouse gas emissions. Processes eliminating the need for sludge disposal without the need for a major sulfur source are environmentally and financially desirable.

Figure 4:
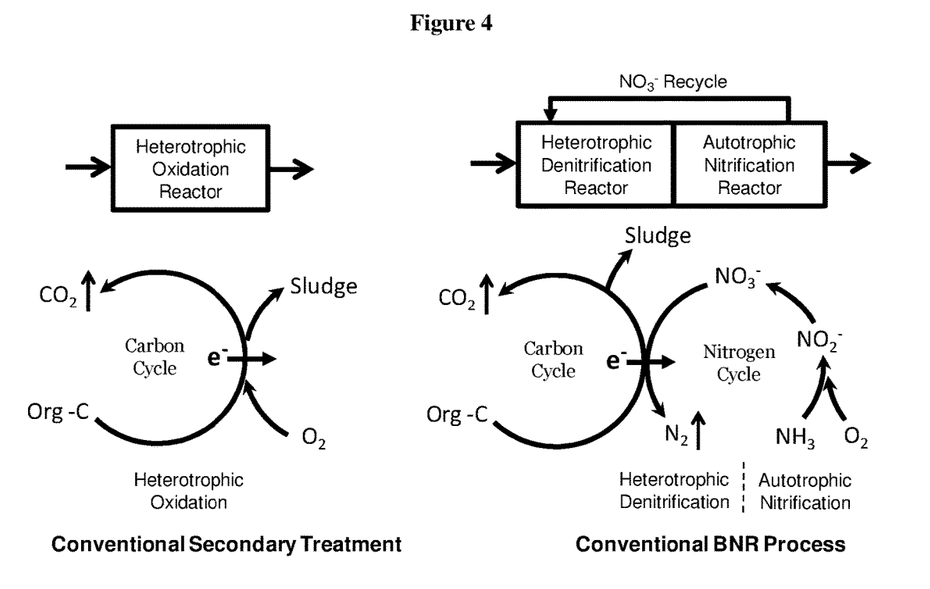
FIG. 4 depicts the conventional prior art secondary treatment and the BNR process.

The conventional biological carbon and nitrogen removal process has changed very little since the discovery of an activated sludge process in 1914 by Ardern and Lockett. The biological processes involved in secondary treatment have remained the same for almost a century, i.e. with electron flow from carbon to oxygen through heterotrophic carbon oxidation. Introduction of the biological nitrogen removal (BNR) processes in the 1960s modified secondary treatment processes by introducing autotrophic nitrification and heterotrophic denitrification processes. In the conventional BNR process, the electron flows from organic carbon to oxygen through integrated carbon and nitrogen cycles as shown in FIG. 4. However, heterotrophic denitrification has a high sludge yield factor, producing excess sludge wastage. Therefore, the BNR process requires increased handling and disposal. Depending on the sludge age, about 50-60% of the organic carbon in the sewage will be converted to $CO_2$, and the remaining 40-50% converted to sewage sludge.

Figure 5:
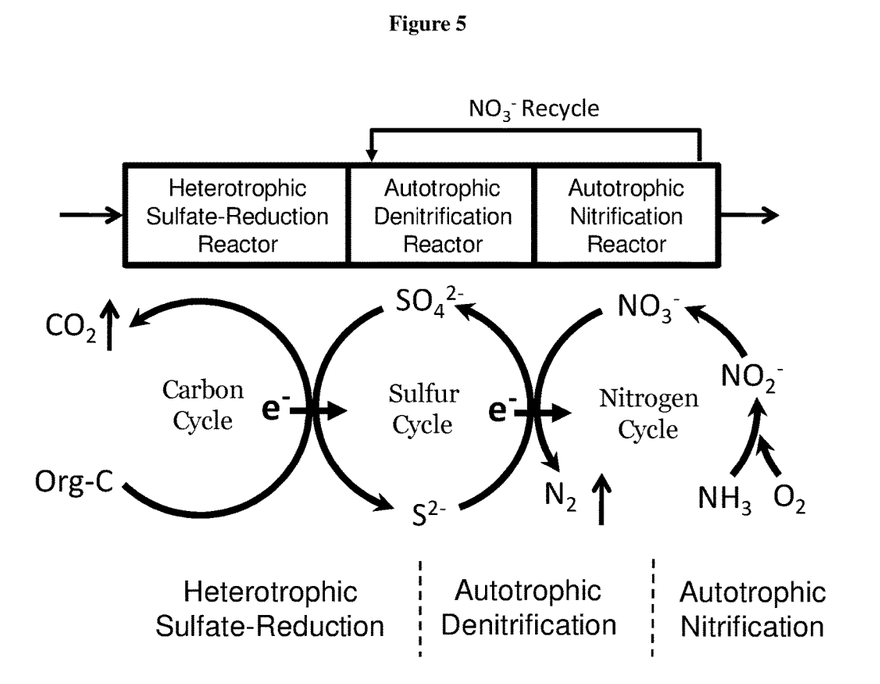
FIG. 5 depicts the prior art SANI process.

In Hong Kong, saltwater is used for toilet flushing. By making use of sulfate ions available in the saline sewage, the Hong Kong University of Science and Technology developed the sulfate reduction autotrophic denitrification and nitrification integrated (SANI) process as shown in FIG. 5 (Lau et al., 2006; Lu et al., 2009; Wang et al., 2009). In the SANI process, sulfate oxidizes organic carbon into $CO_2$ while sulfate reduces to dissolved sulfide by the sulfate reduction bacteria in the first reactor. Ammonia nitrogen oxidizes by oxygen into nitrate in the third reactor by autotrophic nitrifiers. The nitrate is then recycled to the second reactor reacting with sulfide ions to convert into nitrogen gas by the autotrophic denitrifiers while the sulfide is converted back to sulfate ions.

Figure 1:
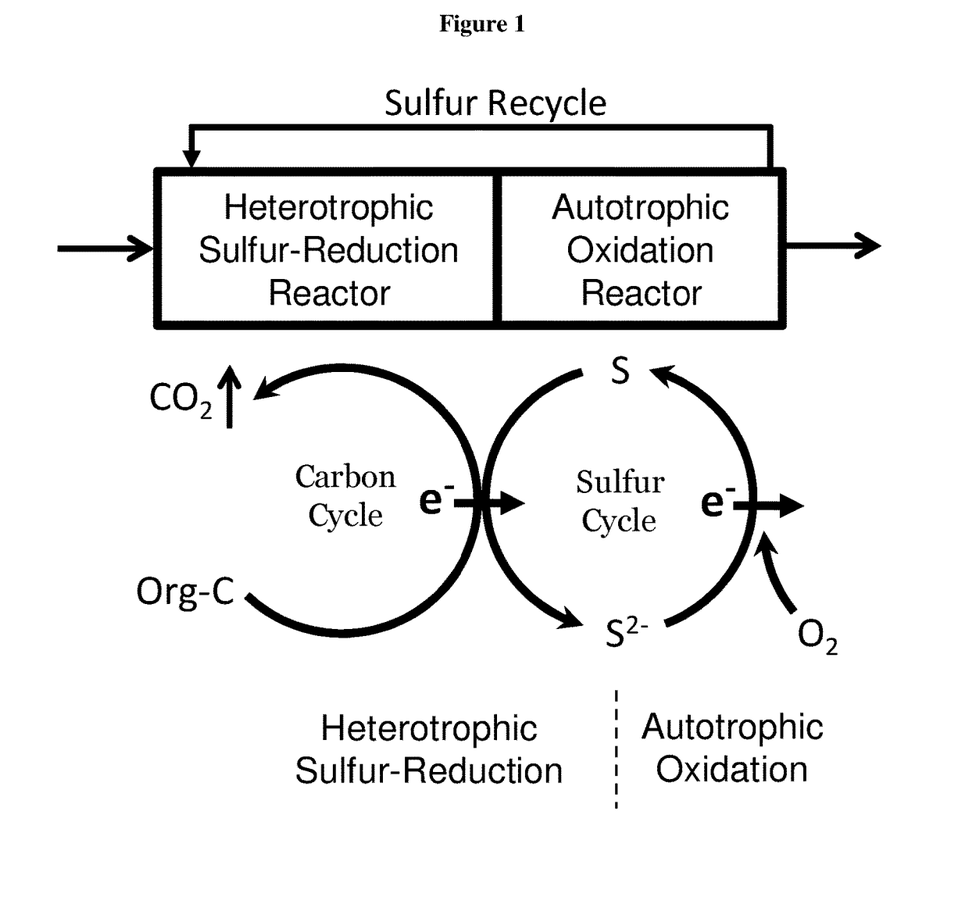
FIG. 1 depicts the ISC process.

In a previous study, an internal sulfur cycling (ISC) process had been proposed to recycle the use of elemental sulfur, as shown in FIG. 1. Elemental sulfur was used as an electron acceptor and final product in the wastewater treatment, thus sulfate was not involved in this process. However, the ISC process did not take nitrogen removal into account. Sulfide oxidation with oxygen is difficult to control with the main product as elemental sulfur. This means that a large proportion of sulfur is further oxidized into sulfate and then removed from the system, thus resulting in sulfur loss.

BRIEF SUMMARY

The present subject matter is directed to a method of removing organic carbon in biological wastewater treatment comprising the steps of: (a) oxidizing organic carbon to carbon dioxide with elemental sulfur as an electron carrier, and reducing the elemental sulfur to sulfide; (b) oxidizing the sulfide to elemental sulfur by recycled nitrate through controlling one or more of a recycling ratio to maintain an oxidation reduction potential (ORP) within the range of −360 mv to −420 mv, using an auto ORP controller; (c) recycling the elemental sulfur formed during oxidation of the sulfide back to the oxidation of the organic carbon; and (d) oxidizing ammonium to nitrate then partially recycling the nitrate back for sulfide oxidation.

In another non-limiting embodiment, the present subject matter is directed to a method of operating of internal sulfur cycling sulfate reduction autotrophic denitrification and nitrification integrated (ISC-SANI) process in the mode of a sequence batch reactor (SBR), comprising the steps of: providing two separate SBRs, a first SBR (SBR1) and a second SBR (SBR2); wherein SBR1 comprises four batch reactors and is operated according to the following steps: introducing sewage to a first reactor of SBR1, passing the sewage to a second reactor of SBR1 and operating the second reactor of SBR1 in an anaerobic mode to produce sulfide waste, passing the sulfide waste to a third reactor of SBR1 and operating the third reactor in an anoxic mode to produce denitrified waste, and passing the denitrified waste to a fourth reactor of SBR1 and allowing the denitrified waste to settle and decant to produce an ammonia containing effluent and sludge; wherein SBR2 comprises 3 batch reactors and is operated according to the following steps: filling a first reactor of SBR2 with the ammonia containing effluent from the fourth reactor of SBR1, passing the ammonia containing effluent to a second reactor of SBR2 and operating the second reactor in an aerobic mode to nitrify the ammonia to nitrate to produce nitrate waste, passing the nitrate waste to a third reactor of SBR2 and allowing the waste to settle and decant to produce an effluent, and recycling the products of the various steps according to the following: passing the sludge produced in the fourth reactor of SBR1 to the first reactor of SBR1, and passing the effluent of the third reactor of SBR2 to the third reactor of SBR1 and the first reactor of SBR2.

In a further non-limiting embodiment, the present subject matter is directed to a method of operating of a simplified internal sulfur cycling sulfate reduction autotrophic denitrification and nitrification integrated (ISC-SANI) process in the mode of a sequence batch reactor (SBR), comprising: providing two separate SBRs, a first SBR (SBR1) and a second SBR (SBR2); SBR1 comprises four batch reactors and is operated according to the following steps: introducing sewage to a first reactor of SBR1, passing the sewage to a second reactor of SBR1 and operating the second reactor of SBR1 in an anaerobic mode to produce sulfide waste, passing the sulfide waste to a third reactor of SBR1 and operating the third reactor in an anoxic mode to produce denitrified waste, and passing the denitrified waste to a fourth reactor of SBR1 and allowing the denitrified waste to settle and decant to produce an ammonia containing effluent and sludge; SBR2 comprises 3 batch reactors and is operated according to the following steps: filling a first reactor of SBR2 with the ammonia containing effluent from the fourth reactor of SBR1, passing the ammonia containing effluent to a second reactor of SBR2 and operating the second reactor in an aerobic mode to nitrify the ammonia to nitrate to produce nitrate waste, passing the nitrate waste to a third reactor of SBR2 and allowing the waste to settle and decant to produce an effluent, and recycling the products of the various steps according to the following: passing the sludge produced in the fourth reactor of SBR1 to the first reactor of SBR1, and passing the effluent of the third reactor of SBR2 to the third reactor of SBR1 and the first reactor of SBR 2.

DETAILED DESCRIPTION

Figure 2:
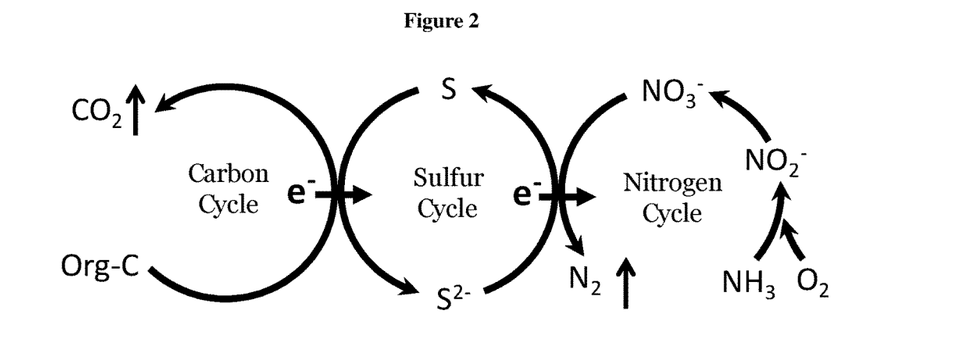
FIG. 2 depicts the electron transfer and biological reactions in the ISC-SANI process.

In order to control the oxidation of sulfide to elemental sulfur instead of sulfate, an internal sulfur cycling—sulfur reduction, autotrophic denitrification and nitrification integrating (ISC-SANI) process was developed, as shown in FIG. 2. Using a continuous input of sulfate ions as the electron carrier is avoided, and the ISC process makes use of an internal recycling stream of elemental sulfur (S) as the electron carrier for oxidizing the organic carbon. This is similar to the ISC process. However, the sulfide generated in the first reactor will be oxidized into elemental sulfur with the recycling nitrate from the third reactor. With $NO_3^-$, sulfide is mostly oxidized into elemental sulfur, then which can be easily separated from bulk water through filtration. In the third reactor, the residual ammonium will be oxidized into nitrite and nitrate with oxygen supply.

Since most of the sulfide can be converted to elemental sulfur and recovered, it has been surprisingly shown that the external sulfur demand can be reduced by around 90% within the novel system of the present disclosure. In particular, the ISC-SANI process as shown in FIG. 2 results in the reduction of the demand for the sulfur.

Figure 3:
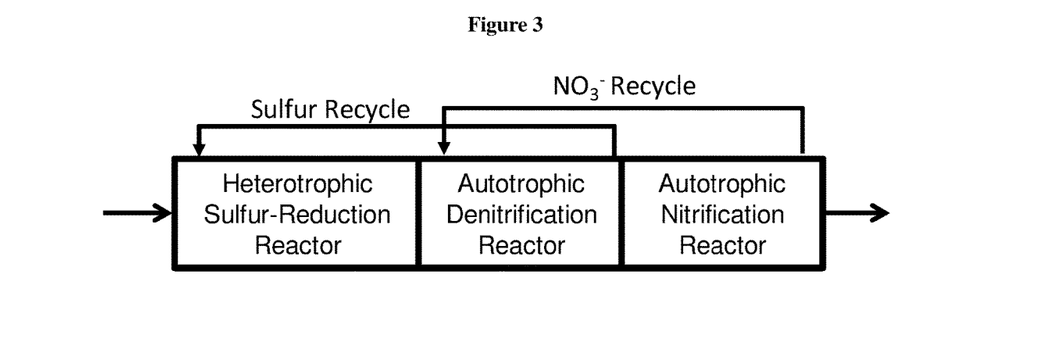
FIG. 3 depicts the conceptual design of the ISC-SANI process.

The conceptual design of the presently inventive ISC-SANI process is shown in FIG. 3 with the following biological processes: In the first reactor, electrons flow from organic carbon to sulfur. As such, the sulfur compound reduces to sulfide while the organic carbon oxidizes to $CO_2$ through heterotrophic sulfur reduction. The sulfide formed then flows to the second reactor. In the second reactor, electrons flow from sulfide to nitrogen. The sulfide oxidizes to elemental sulfur through controlling the oxidation and reduction potential (ORP) of the reactor while nitrate reduces to nitrogen gas through autotrophic denitrification. In the third reactor, electrons flow from ammonia to oxygen with nitrate formed through autotrophic nitrification which is then recycled back to the second reactor. The elemental sulfur in the second reactor is recycled back to the first reactor for organic carbon oxidation. The reactions in the inventive ISC-SANI process are listed below:

Heterotrophic Sulphur Reduction $$CH_3COO^- + 4S^0 + 4H_2O \rightarrow 2HCO_3^- + 4H_2S + 2H^+ \quad (1)$$

Anoxic Sulphide Oxidation $$5HS^- + 2NO_3^- + 7H^+ \rightarrow N_2 + 5S^0 + 6H_2O \quad (2)$$

Nitrification $$2NH_4^+ + 3O_2 \rightarrow 2NO_2^- + 2H_2O + 4H^+ \quad (3)$$

$$2NO_2^- + O_2 \rightarrow 2NO_3^- \quad (4)$$

Through this ISC-SANI process, biological nitrogen removal in wastewater treatment is achieved with minimal sewage sludge production, while at the same time the total sulfur demand is reduced by 90% as compared with SANI process alone.

In the SANI process, nitrogen and carbon removal relies solely on a continuous supply of sulfate from seawater in order to carry out the heterotrophic reduction of sulfate to sulfide by sulfate-reducing bacteria and to accomplish the oxidation of organic carbon to carbon dioxide, as well as the autotrophic denitrification by converting sulfide to sulfate. The reactions in the SANI process are as follows:

Sulfate Reduction $$CH_3COO^- + SO_4^{2-} \rightarrow 2HCO_3^- + HS^- \quad (5)$$

Sulfide Oxidation and Conversion to Sulfate within Autotrophic Denitrification $$5HS^- + 8NO_3^- + 3H^+ \rightarrow 5SO_4^{2-} + 4N_2 + 4H_2O \quad (6)$$

Nitrification $$2NH_4^+ + 3O_2 \rightarrow 2NO_2^- + 2H_2O + 4H^+ \quad (7)$$

$$2NO_2^- + O_2 \rightarrow 2NO_3^- \quad (8)$$

To expand the applicability of the SANI process, internal sulfur cycling ISC-SANI process was developed. While the ISC process was previously proposed to recycle the use of elemental sulfur, the ISC process is deficient for failing to take nitrogen removal into account. Sulfide oxidation with oxygen is poorly controlled and a large proportion of sulfur is oxidized into sulfate and then removed from the system, thus resulting in sulfur loss. The reactions of the ISC process are as follows:

Sulfur Reduction $$CH_3COO^- + 4S^0 + 4H_2O \rightarrow 2HCO_3^- + 4HS^- + 5H^+ \quad (9)$$

Sulfide Oxidation to Elemental Sulfur within Aerobic Condition $$2HS^- + O_2 \rightarrow 2S^0 + 2OH^- \quad (10)$$

Figure 6:
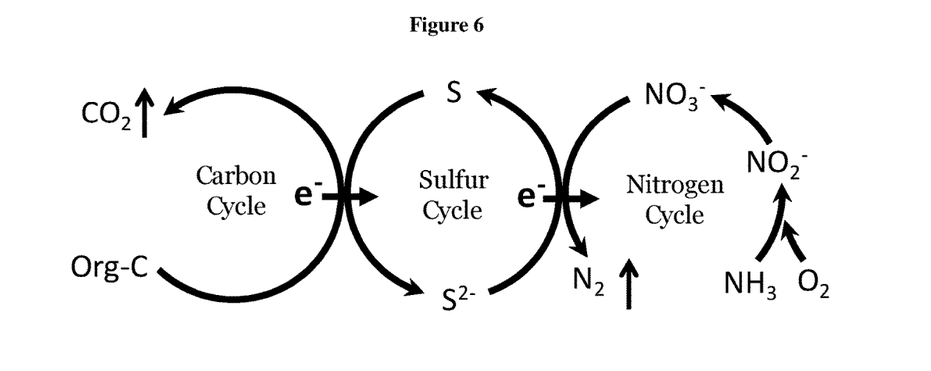
FIG. 6 depicts the electron transfer and biological reactions of the ISC-SANI process.

In the ISC-SANI process, elemental sulfur, instead of sulfate, is used as the electron carrier for oxidation of organic carbon and reduction of the nitrate nitrogen (as shown in FIG. 6 by limiting the oxidation of sulfide ($S^{2-}$) to elemental sulfur (S) instead of sulphate to control the oxidation and reduction potential (ORP) of the reactor. The control of ORP is achieved by controlling the recycling ratio of nitrate and closely monitoring with an ORP analyzer.

Elemental sulfur is a solid and can be separated from the liquid phase. By recycling the solids back to the first reaction zone by means of a sequencing batch reactor (SBR) arrangement, S acts as an electron carrier for oxidizing organic carbon. Through recycling S, theoretically, the need for a continuous input of sulfate in the waste stream is avoided. A small percentage of sulfur is lost with the sewage effluent during practice, and addition of sulfur compounds, such as sulfate, sulfite salts, S, etc., to the system is required. However, compared to the SANI process, ISC-SANI reduces the sulfur demand by about 90%.

Some differences between ISC, SANI and ISC-SANI processes can be found in comparison of the sulfide-oxidizing product and reactor condition, as well as the nitrogen and sulfur cycles. For example, in the inventive ISC-SANI process, denitrification is mainly performed by nitrate-reducing sulfide-oxidation bacteria (NR-SOB) under anoxic condition (equation 2) with automatical control of the nitrate recycling ratio according to ORP by a real-time ORP monitor, and the main product is elemental sulfur. However, in the ISC process, nitrate or nitrogen is not involved, and sulfide is oxidized by sulfide oxidation bacteria (SOB) under aerobic conditions (equation 10). While according to the SANI process, sulfide is completely oxidized into sulfate within autotrophic denitrification (equation 6), and ORP or nitrate recycling ratio is not controlled in this reactor. Thus, The ISC process is completely an internal sulfur cycle and no nitrogen cycle is involved, and the SANI process is an incomplete sulfate cycle, because sulfate is released from the system and no nitrogen cycle is involved. The auto control of recycling ration to maintain ORP in the range of −360 mv to −420 mv in the autotrophic denitrification reactor is essential for elemental sulfur recovery.

Figure 7:
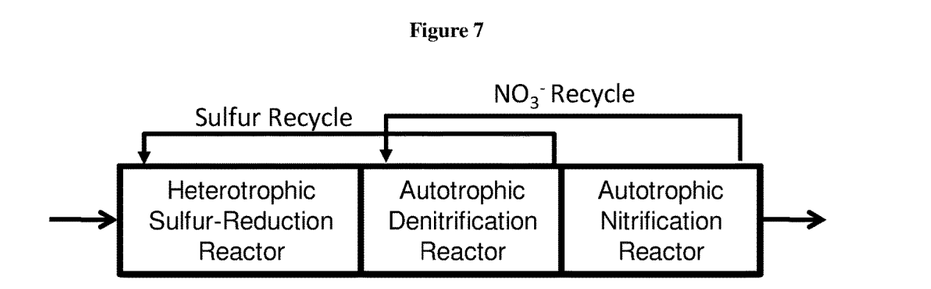
FIG. 7 depicts a conceptual diagram of the ISC-SANI process.

The conceptual design of the ISC-SANI is shown in FIG. 7 and detailed as follows:

In Reactor 1, the electrons flow from organic carbon to sulfur by means of the heterotrophic sulfur-reducing bacteria ($S^0RB$). As a comparison, the bacteria to oxidized organi in SANI process are sulfate-reducing bacteria (SRB). By experimental investigation, SORB and SRB are totally different. Only limited species of SRB are capable to reduce elemental sulfur. During the start-up period, excessive elemental sulfur is dosed into Reactor 1 for bacteria cultivation. After the system stabilizes, elemental sulfur recycled from Reactor 2 is used as the electron acceptor. The sulfur compounds are reduced to sulfide while organic carbon is oxidized into $CO_2$. The sulfide formed in Reactor 1 flows to Reactor 2.

In Reactor 2, the electrons flow from the sulfide to nitrogen through autotrophic sulfur-oxidation/denitrifying bacteria by reducing the nitrate to nitrogen gas. By controlling the ORP of Reactor 2 through controlling the recycling ratios of nitrate and sulfur, sulfide is oxidized back to elemental sulfur. In this situation with nitrate, the main product of sulphide oxidation is elemental sulfur, rather than sulfate. Thus, a high selectivity of sulfur recovery can be realized. This is an important advantage of ISC-SANI process in comparison with ISC process. In the ISC process, it is very difficult to maintain a high selectivity of sulfur recovery because sulfide would be easily oxidized into sulfate with oxygen. Elemental sulfur is a solid and is separated from the liquid phase. By recycling the solid elemental sulfur and other solids to Reactor 1, elemental sulfur is used for the organic carbon oxidation, again. Moreover, as alkalinity increases due to denitrification in the Reactor 2, as shown in Eq. 2, this provides adequate alkalinity for nitrification process in Reactor 3.

In Reactor 3, ammonia nitrogen originated from the wastewater is oxidized by oxygen through autotrophic nitration and nitrification bacteria. The ammonia nitrogen is oxidized into nitrite then nitrate, which is then recycled back to Reactor 2 to accomplish the aforesaid autotrophic denitrification process.

Figure 8:
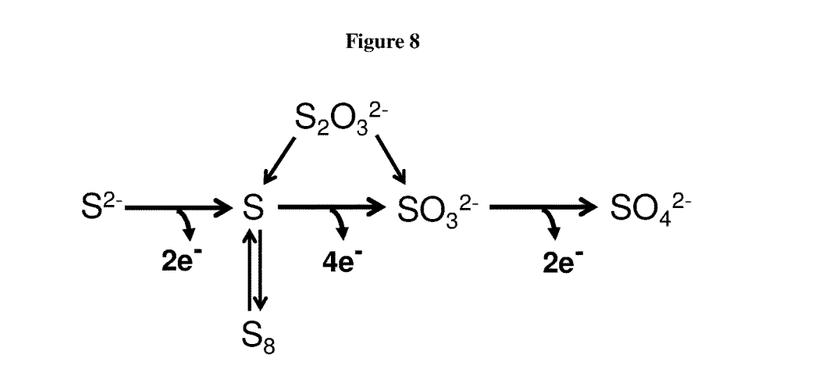
FIG. 8 depicts the key biological reactions in the oxidation of sulfur compounds in the ISC-SANI process.

Several biological processes and bacteria are involved in the ISC-SANI process. Instead of making use of the higher oxidation state sulfur compounds, i.e. $SO_4^{2-}$, $SO_3^{2-}$ and $S_2O_3^{2-}$, as shown in FIG. 8, only the oxidation and reduction between $S^{2-}$ and $S^0$ is used. The biological sulfur oxidation processes involved in the oxidation of sulfide to sulfur are conducted by autotrophic bacteria (Schlegel, 1990a). In the reverse reaction, reduction of the sulfur to sulfide is conducted by heterotrophic sulfur-reducing bacteria (Schlegel, 1990b). Depending on the reactor design, the ISC-SANI process may be operated in many different forms, i.e. single sludge/separate sludge activated sludge system, attached growth systems, such as biological aerated filters (BAF or AF), a sequencing batch reactor (SBR), a membrane bioreactor (MBR), or an upflow sludge bed (USB) system, etc.

Figure 9:
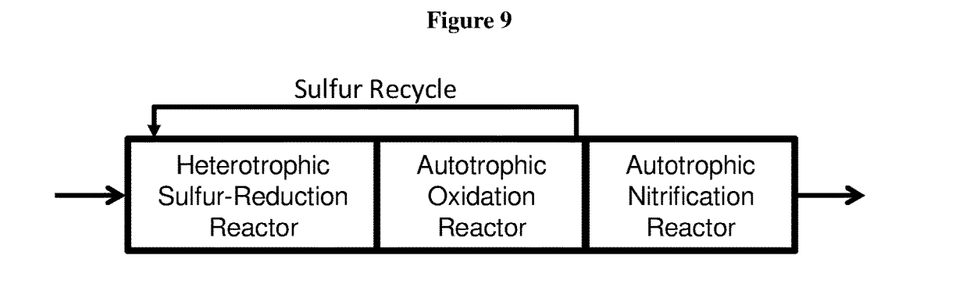
FIG. 9 depicts the addition of a nitrification reactor to the simplified ISC-SANI process.

All three key biological processes, i.e. heterotrophic sulfur reduction, autotrophic denitrification and autotrophic nitrification, have very low sludge yield. Accordingly, the ISC-SANI process produces minimal biological solid waste and practically eliminates the need for sludge disposal, which amounts up to 50% of the sewage treatment cost. Energy consumption is also reduced by one-third, as are greenhouse gas emissions.

Where nitrification is required but nitrogen removal is not, the ISC-SANI process can be modified by simply adding a nitrification reactor at the end to complete the nitrification process as shown in FIG. 9.

Compared to conventional activated sludge and BNR process, the SANI process makes use of the sulfur compounds as electron carrier for oxidation of organic carbon to carbon dioxide. Both the heterotrophic sulfur-reduction and autotrophic sulfur-oxidation processes have very low sludge yield factor, and the sludge production rate of the SANI process is much lower than conventional biological treatment. The need for sludge wastage, which requires sludge handling and disposal are effectively minimized.

Sludge thickening, digestion, dewatering and disposal facilities usually represent 40-60% of construction costs of sewage treatment plants and accounts for 50% of operating costs (Peavy et al., 1986). Since SANI process effectively eliminates the need for sludge handling and disposal, overall costs can be reduced by 50%. Because sludge dewatering and incineration are energy consuming, the estimation is that eliminating the sludge handling and incineration processes with SANI process, can result in about a one third of energy saving and greenhouse gas emission as compared with conventional biological treatment process.

The SANI process relies on the continuous inflow of sulfate as the electron carrier. The ISC-SANI has the same benefits as the SANI process, i.e. very low sludge yield, as well as additional benefits. First, sulfur demands are reduced by about 90% as most of the sulfur is recycled internally in the form of elemental sulfur for the purpose of an electron carrier. This makes application in other areas where a free sulfur source (e.g. sulfate in seawater or acid mine drainage) is not available possible. Secondly, the ISC-SANI process can be adapted by simple modification and applied to an existing activated sludge system. This minimizes retrofitting costs for converting existing conventional activated sludge process to ISC-SANI compared to the original SANI process.

Although addition of elemental sulfur is required replenish what is lost through the effluent, elemental sulfur is readily available and relatively cheap worldwide. Thus, the cost saved from sludge disposal is significantly higher than the cost of elemental sulfur dosage. Moreover, if any industrial developments are nearby producing waste streams containing sulfate, sulfite, sulfide or elemental sulfide, then these can be used as a sulfur source for the ISC-SANI process thereby further reducing operational costs.

Figure 10:
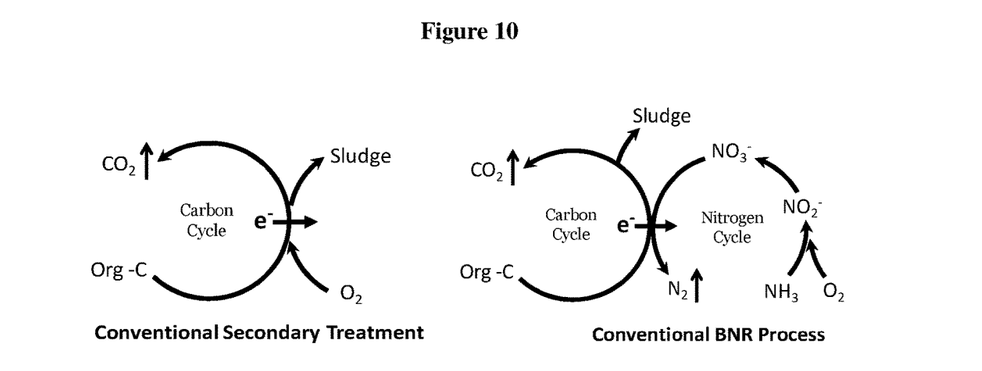
FIG. 10 depicts the organic and nitrogen removal pathway in the conventional prior art process.
Figure 11:
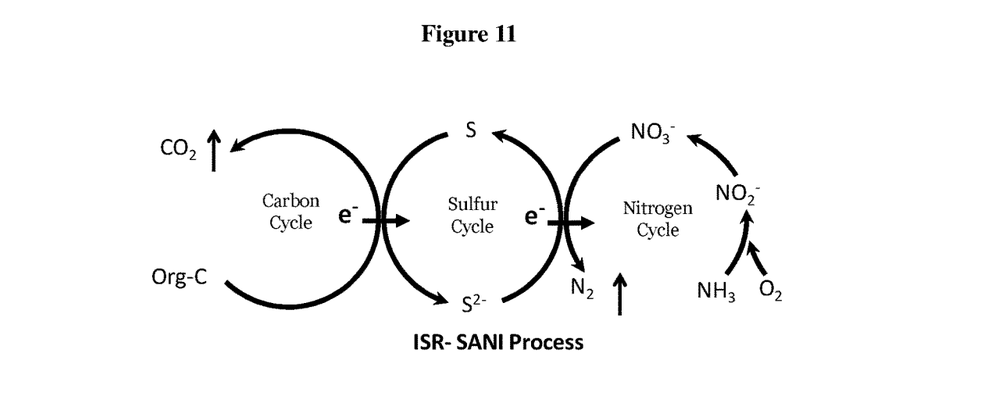
FIG. 11 depicts the organic and nitrogen removal pathway in the ISC-SANI process.
Figure 12:
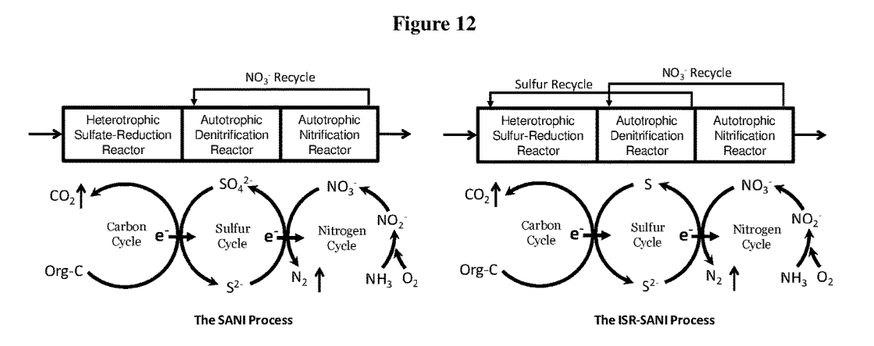
FIG. 12 depicts a comparison of the SANI and the ISC-SANI processes.

Compared to conventional secondary treatment and BNR process (as seen in FIG. 10), the ISC-SANI process introduces a sulfur cycle by making use of the sulfur compounds as the electron carrier for oxidation of organic compounds as can be seen in FIG. 11. Further, the original SANI process relies on a continuous supply of sulfate ion as the electron carrier. As compared with the original SANI process, the ISC-SANI process makes use of recycling the elemental sulfur as the electron carrier as is shown in FIG. 12. As elemental sulfur is in solid form, it can be easily separated from the liquid phase and recycled for oxidation of the organic carbon, thus largely reducing the sulfur demand (as discussed herein above).

The process of the present disclosure provides a method of removing organic carbon in biological wastewater treatment. The method can involve the steps of: oxidizing organic carbon to carbon dioxide with elemental sulfur as an electron carrier, and reducing the elemental sulfur to sulfide; oxidizing the sulfide to elemental sulfur by controlling one or more of a recycling ratio using an automatical ORP controller. By increasing the recycling ratio to 4-9, most of produced nitrate in the $3^{rd}$ reactor will be recycled to the $2^{nd}$ reactor for sulfide oxidation. The recycling ratio from the $3^{rd}$ reactor to the $2^{nd}$ reactor is automatically controlled by a ORP controller, to maintain the ORP between −360 mv to −420 mv. This automatical control of the recycling ratio by a ORP controller is essential to increase the selectivity of sulfide oxidation into elemental sulfur. The elemental sulfur formed during oxidation of the sulfide is recycled back to $1^{st}$ reactor for the oxidation of the organic carbon.

Example of the ISC-SANI Processes

Depending on the reactor design, the ISC-SANI and Simplified ISC-SANI process can be operated in many different forms such as a single sludge/separate sludge activated sludge system, attached growth systems such as biological aerated filters (BAF or AF), a sequencing batch reactor (SBR), a membrane bioreactor (MBR), or an upflow sludge bed (USB) system, etc. To illustrate the design of the ISC-SANI and Simplified ISC processes, the SBR designs as shown below will be used:

EXAMPLE 1

ISC-SANI Process

Figure 13:
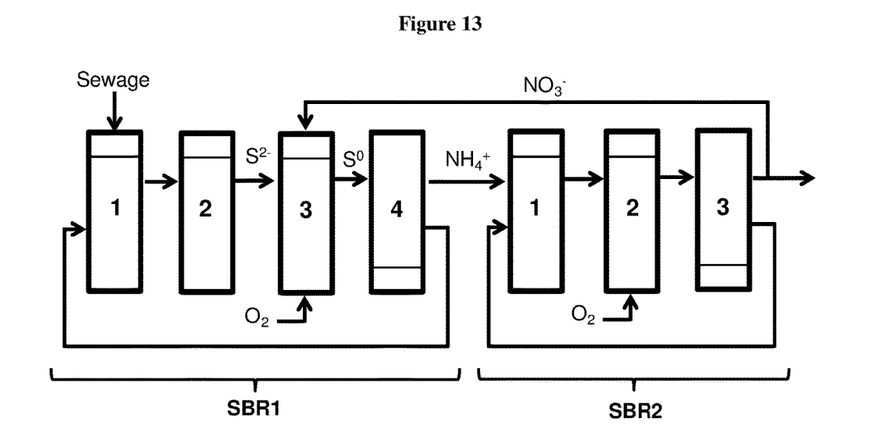
FIG. 13 depicts the operation of the ISC-SANI process as a sequencing batch reactor.

FIG. 13 shows the operation of the ISC-SANI process in the mode of an SBR. The set up involves two separate SBRs, with details shown below:

SBR1: 1) SBR1 will be filled with sewage. If needed, sulfur compounds will be added to replenish any loss of sulfur in the effluent. Sulfur compounds in any forms, such as $SO_4^{2-}$, $SO_3^{2-}$, $S_2O_3^{2-}$, $S^0$, or $S^{2-}$, can be used to satisfy the sulfur loss in the effluent; 2) The SBR will be operated in the anaerobic mode. Organic carbon is oxidized to $CO_2$ while the recycled elemental sulfur ($S^0$) and the added sulfur compounds will be reduced to sulfide; 3) The SBR1 will be operated in the anoxic mode. Effluent from SBR2 will be recycled to provide the nitrate for autotrophic denitrification. An ORP controller controls the recycle ratio from SBR2 to SBR1 to maintain the ORP in SBR1 within −360 mv to −420 mv The oxidation from $S^{2-}$ to $S^0$ is controlled by means of carefully controlling the recycle ratios and close monitoring of the ORP of the anoxic zone; and 4) The SBR1 will be allowed to settle and decantation. The effluent will then pass to SBR2 for nitrification. The elemental sulfur will stay in SBR1 together with the sludge for another cycle of reaction.

SBR2: 1) SBR2 will be filled with effluent from SBR1 which contains ammonia; 2) SBR2 will be operated in aerobic mode, with ammonia fully nitrified to nitrate; 3) SBR2 will be allowed to settle and decantation. Part of the effluent will then be passed to SBR1 for denitrification.

EXAMPLE 2

Simplified ISC-SANI Process

Figure 14:
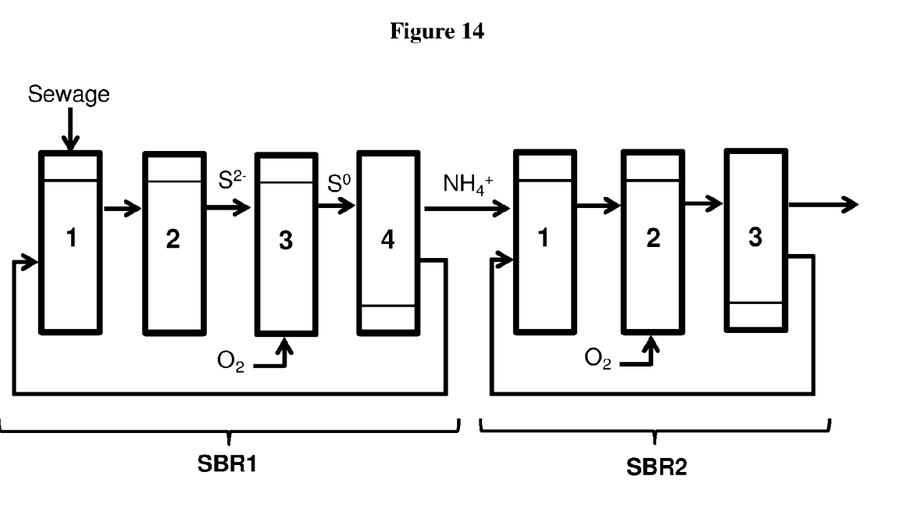
FIG. 14 depicts the operation of the simplified ISC-SANI process as a sequencing batch reactor.

FIG. 14 shows the operation of the simplified ISC-SANI process in the mode of an SBR. The set up involves two separate SBRs with similar operation as in the ISC-SANI process, with details shown below:

SBR1: 1) SBR1 will be filled with sewage. If needed, sulfur compounds will be added to replace any loss of sulfur in the effluent. Sulfur compounds in any forms, such as $SO_4^{2-}$, $SO_3^{2-}$, $S_2O_3^{2-}$, $S^0$, or $S^{2-}$, can be used to satisfy the sulfur loss in the effluent; 2) The SBR will be operated in the anaerobic mode. Organic carbon is oxidized to $CO_2$ while the recycled elemental sulfur ($S^0$) and the added sulfur compounds will be reduced to sulfide; 3) The SBR1 will be operated in the aerobic mode. A small amount of oxygen will be provided to the reactor enable complete conversion of the sulfide to elemental sulfur. The oxidation from $S^{2-}$ to $S^0$ is carefully controlled by close monitoring of the ORP of the reactor; and 4) The SBR1 will be allowed to settle and decantation. The effluent will then be passed to SBR2 for nitrification. The elemental sulfur will stay in SBR1 together with the sludge for another cycle of reaction.

SBR2: 1) SBR2 will be filled with effluent from SBR1 which contains ammonia; 2) SBR2 will be operated in aerobic mode, mainly for the purpose of converting any remaining sulfur compounds to sulfate. If necessary, more oxygen can be added to ensure complete nitrification; 3) SBR2 will be allowed to settle and decantation.

Therefore, it will be understood that many additional changes in the details, materials, steps and arrangement of parts, which have been herein described and illustrated to explain the nature of the disclosure, may be made by those skilled in the art within the principal and scope of the disclosure as expressed in the appended claims. It will also be understood that the example set forth herein are for illustrative purposes and are not meant to be limiting to the scope of the present subject matter as defined in the claims below.

The invention claimed is:

1. A method of operating of internal sulfur cycling sulfate reduction autotrophic denitrification and nitrification integrated (ISC-SANI) process in the mode of a sequence batch reactor (SBR), comprising:
   providing two separate SBRs, a first SBR (SBR1) and a second SBR (SBR2);
   wherein SBR1 comprises four batch reactors and is operated according to the following steps:
   introducing sewage to a first reactor of SBR1,
   passing the sewage to a second reactor of SBR1 and operating the second reactor of SBR1 in an anaerobic mode to produce sulfide waste,
   passing the sulfide waste to a third reactor of SBR1 and operating the third reactor in an anoxic mode to produce denitrified waste, and passing the denitrified waste to a fourth reactor of SBR1 and allowing the denitrified waste to settle and decant to produce an ammonia containing effluent and sludge;

SBR2 comprises 3 batch reactors and is operated according to the following steps:

filling a first reactor of SBR2 with the ammonia containing effluent from the fourth reactor of SBR1, passing the ammonia containing effluent to a second reactor of SBR2 and operating the second reactor in an aerobic mode to nitrify the ammonia to nitrate to produce nitrate waste, passing the nitrate waste to a third reactor of SBR2 and allowing the waste to settle and decant to produce an effluent; and recycling the products of the various steps according to the following:

passing the sludge produced in the fourth reactor of SBR1 to the first reactor of SBR1, and passing the effluent of the third reactor of SBR 2 to the third reactor of SBR1 and the first reactor of SBR 2.

2. The method of claim 1, further comprising adding sulfur compounds to the sludge passed to the first reactor of SBR1.

3. The method of claim 2, further comprising oxidizing organic carbon to $CO_2$ and reducing elemental sulfur and the added sulfur compounds to sulfide during the anaerobic mode.

4. The method of claim 1, further comprising autotrophic denitrification sulfide in the anoxic mode in the third reactor of SBR1, wherein the autotrophic denitrification results in the conversion of sulfur dioxide to elemental sulfur with nitrate.

5. A method of operating of a simplified internal sulfur cycling sulfate reduction autotrophic denitrification and nitrification integrated (ISC-SANI) process in the mode of a sequence batch reactor (SBR), comprising:

providing two separate SBRs, a first SBR (SBR1) and a second SBR (SBR2);

SBR1 comprises four batch reactors and is operated according to the following steps:

introducing sewage to a first reactor of SBR1, passing the sewage to a second reactor of SBR1 and operating the second reactor of SBR1 in an anaerobic mode to produce sulfide waste, passing the sulfide waste to a third reactor of SBR1 and operating the third reactor in an anoxic mode to produce denitrified waste, and passing the denitrified waste to a fourth reactor of SBR1 and allowing the denitrified waste to settle and decant to produce an ammonia containing effluent and sludge;

SBR2 comprises 3 batch reactors and is operated according to the following steps:

filling a first reactor of SBR2 with the ammonia containing effluent from the fourth reactor of SBR1, passing the ammonia containing effluent to a second reactor of SBR2 and operating the second reactor in an aerobic mode to nitrify the ammonia to nitrate to produce nitrate waste, passing the nitrate waste to a third reactor of SBR2 and allowing the waste to settle and decant to produce an effluent; and recycling the products of the various steps according to the following:

passing the sludge produced in the fourth reactor of SBR1 to the first reactor of SBR1, and passing the effluent of the third reactor of SBR 2 to the third reactor of SBR1 and the first reactor of SBR 2.

\* \* \* \* \*